(12) United States Patent
Shochet et al.

(10) Patent No.: US 7,908,324 B2
(45) Date of Patent: Mar. 15, 2011

(54) MULTI-USER INTERACTIVE COMMUNICATION NETWORK ENVIRONMENT

(75) Inventors: Joe Shochet, Santa Clarita, CA (US); Darren Ranalli, Burbank, CA (US); Jesse Schell, Carnegie, PA (US)

(73) Assignee: Disney Enterprises, Inc., Burbank, CA (US)

( * ) Notice: Subject to any disclaimer, the term of this patent is extended or adjusted under 35 U.S.C. 154(b) by 1224 days.

(21) Appl. No.: 10/677,958

(22) Filed: Oct. 1, 2003

(65) Prior Publication Data
US 2004/0153557 A1 Aug. 5, 2004

Related U.S. Application Data

(60) Provisional application No. 60/415,730, filed on Oct. 2, 2002.

(51) Int. Cl.
*G06F 15/16* (2006.01)
*G06F 17/00* (2006.01)
*G06F 19/00* (2006.01)
*A63F 9/24* (2006.01)
*A63F 13/00* (2006.01)

(52) U.S. Cl. ........ 709/205; 709/204; 709/206; 709/207; 709/227; 709/228; 709/229; 463/40; 463/41; 463/42

(58) Field of Classification Search .................. 709/204; 463/40, 41, 42
See application file for complete search history.

(56) References Cited

U.S. PATENT DOCUMENTS

| | | |
|---|---|---|
| 4,333,152 A | 6/1982 | Best |
| 4,445,187 A | 4/1984 | Best |
| 4,465,465 A | 8/1984 | Nelson |
| 5,358,259 A | 10/1994 | Best |
| 5,384,893 A | 1/1995 | Hutchins |
| 5,393,073 A | 2/1995 | Best |
| 5,623,406 A | 4/1997 | Ichbiah |
| 5,664,126 A | 9/1997 | Hirakawa et al. |

(Continued)

FOREIGN PATENT DOCUMENTS

GB 2 343 529 5/2000

(Continued)

OTHER PUBLICATIONS

Wikipedia; http://en.wikipedia.org/wiki/Wizard101; Wizard 101 game; Section: "Online safety features", Sep. 2, 2008.*

(Continued)

*Primary Examiner* — Vivek Srivastava
*Assistant Examiner* — Lin Liu
(74) *Attorney, Agent, or Firm* — Ference & Associates LLP (57) ABSTRACT

A system and method for initiating communication in real-time between two users in a multi-user communication environment. To limit the receipt of unwanted messages, a unique code is provided to a first user and transmitted by the first user to a second user outside of the multi-user communication environment. The second user may then initiate real-time communication with the first user after the code is authenticated in the multi-user communication environment. To ensure secure and comprehensible communications, at least one word may be selected from a first menu having a plurality of words to enable a second menu comprising a plurality of words. A string is formed by selecting at least one of a word from the second menu which string may then be communicated to at least one of a user or a program in the multi-user communication environment.

21 Claims, 10 Drawing Sheets

U.S. PATENT DOCUMENTS

| | | | |
|---|---|---|---|
| 5,884,161 A | | 3/1999 | Hegeman et al. |
| 6,078,650 A | | 6/2000 | Hansen |
| 6,138,145 A | | 10/2000 | Kawanaka |
| 6,144,848 A | | 11/2000 | Walsh et al. |
| 6,161,082 A | * | 12/2000 | Goldberg et al. .................. 704/3 |
| 6,205,479 B1 | | 3/2001 | Dulai et al. |
| 6,219,045 B1 | | 4/2001 | Leahy et al. |
| 6,232,966 B1 | | 5/2001 | Kurlander |
| 6,532,488 B1 | | 3/2003 | Ciarlante et al. |
| 6,714,982 B1 | | 3/2004 | McDonough et al. |
| 6,784,901 B1 | * | 8/2004 | Harvey et al. .................. 715/757 |
| 7,240,093 B1 | * | 7/2007 | Danieli et al. ................. 709/205 |
| 2002/0049805 A1 | * | 4/2002 | Yamada et al. ................. 709/202 |
| 2002/0059379 A1 | * | 5/2002 | Harvey et al. .................. 709/205 |
| 2002/0061779 A1 | | 5/2002 | Maehiro |
| 2002/0062348 A1 | * | 5/2002 | Maehiro ....................... 709/205 |
| 2002/0126846 A1 | * | 9/2002 | Multerer et al. .............. 380/251 |
| 2003/0114226 A1 | | 6/2003 | Kimura |
| 2003/0134678 A1 | | 7/2003 | Tanaka |
| 2003/0237055 A1 | * | 12/2003 | Lange et al. .................. 715/530 |

FOREIGN PATENT DOCUMENTS

| | | |
|---|---|---|
| KR | 20020012725 | 2/2002 |
| WO | WO 02/059770 A1 | 8/2002 |

OTHER PUBLICATIONS

Office Action dated May 27, 2009 from corresponding Japanese Application No. 2004-544798.

Daniel Huebner, Industry Watch the Buzz about the Game Biz, Game Developer, Jul. 2001, p. 8, United Business Media, LLC, NY.

Disney Interactive, Inc., Disney Girlfriends, CD-ROM, Sep. 4, 2001, Disney Enterprises, Inc., Burbank, CA.

Sonic Team, Phantasy Star Online, Dream Cast Disk, Jan. 29, 2001, North America.

Supplementary European Search Report for Application No. EP 03 77 4556, Oct. 28, 2010 (4 pages).

* cited by examiner

MULTI-USER INTERACTIVE COMMUNICATION NETWORK ENVIRONMENT

RELATED APPLICATIONS

This application claims the benefit of U.S. Provisional Patent Application Serial No. 60/415,730 filed Oct. 2, 2002 the disclosure of which is hereby incorporated by reference in its entirety.

BACKGROUND OF THE INVENTION

This disclosure generally relates to communication networks and, more particularly, to a multi-user interactive communication network environment that allows multiple users to communicate with each other and/or the environment in real time through an input device such as a keyboard, a mouse, a microphone (in a speech recognition based environment), etc.

In recent years, following the development and spread of computers, there have been increasing opportunities for users to interact with each other in real time via a communication network. However, this real-time transmission of information (e.g., text, images, and audio) is inherently unsafe. As an example, it is quite easy for one user, e.g., at a computer terminal, to initiate communication with another user, e.g., at a separate computer terminal, for extracting information by posing a series of questions. Specifically, in one instance, an individual could extract key information, such as home-address/phone-number/school-information, from a child or minor.

Another problem that is typically experienced among users in an interactive multi-user environment is the ability for one user to initiate communication with another user in the same environment at any time. As an example, in a multi-user chat room, user X may initiate chat with another user Y by sending a text message before obtaining permission from user Y to initiate chat. This is a serious problem, especially, when user Y is a child and the chat initiator (i.e., user X) has illegal motives.

Furthermore, in the communication environment, much of the communication between users and the environment is done by typing text messages. This can be a fairly difficult, slow, and a tedious process for users such as children, the handicapped, or people that simply cannot type (e.g., owing to skill, key size on the keyboard, or lack of keyboard access all together). Moreover, in such a communication environment there is no mechanism that guides the messaging interaction between users and the environment in a proper manner. As an example, in a gaming environment, the textual conversation between gamers, and/or between gamers and the game Artificial Intelligence ("AI"), can go from being coherent to fairly nonsensical. Specifically, if a gamer is provided with an ability to communicate with a non-player character ("NPC") via text, there is a fairly high probability that the gamer will type arbitrary text messages in the text interface, thereby interacting incorrectly with the game AI.

SUMMARY OF THE INVENTION

To address these and other problems, described hereinafter is an improved interactive communication network environment that allows multiple users to communicate with each other and/or the environment in real time, through an input device such as a keyboard, a mouse, a microphone (in a speech recognition based environment), etc. In particular, to allow users to securely exchange communications, the interactive communication network environment may be provided with a menu system from which only predetermined chat messages may be formed. To prevent the receipt of unwanted textual communications from other users, the interactive communication network environment may be provided with a system that requires users to first notify others of a password that is needed to transmit such communications to the user. These and other advantages, features, properties, objects, and relationships of the improved interactive communication network environment will be obtained from the following detailed description and accompanying drawings which set forth illustrative embodiments which are indicative of the various ways in which the principles of the improved interactive communication network environment may be employed.

BRIEF DESCRIPTION OF THE DRAWINGS

An exemplary interactive communication network environment is hereinafter described with reference to the following drawings in which.

DETAILED DESCRIPTION OF THE INVENTION

With reference to the drawings, wherein like reference numerals refer to like elements, the following describes an exemplary interactive communication network environment that allows multiple users to communicate with each other and/or the environment in real time, through an input device such as a keyboard, a mouse, a microphone (in a speech recognition based environment), etc. By way of example only, the interactive communication network environment will be described in the general context of a network game system in which multiple users participate and progress within the game by exchanging data with a game server 20, illustrated in FIG. 1, by means of client processing devices 10. The exchanged data allows users to interact with the player characters of other users and possibly with non-player characters that are under the control of the game server 20 for the purpose of achieving various goals and objectives that define game play.

Figure 1:
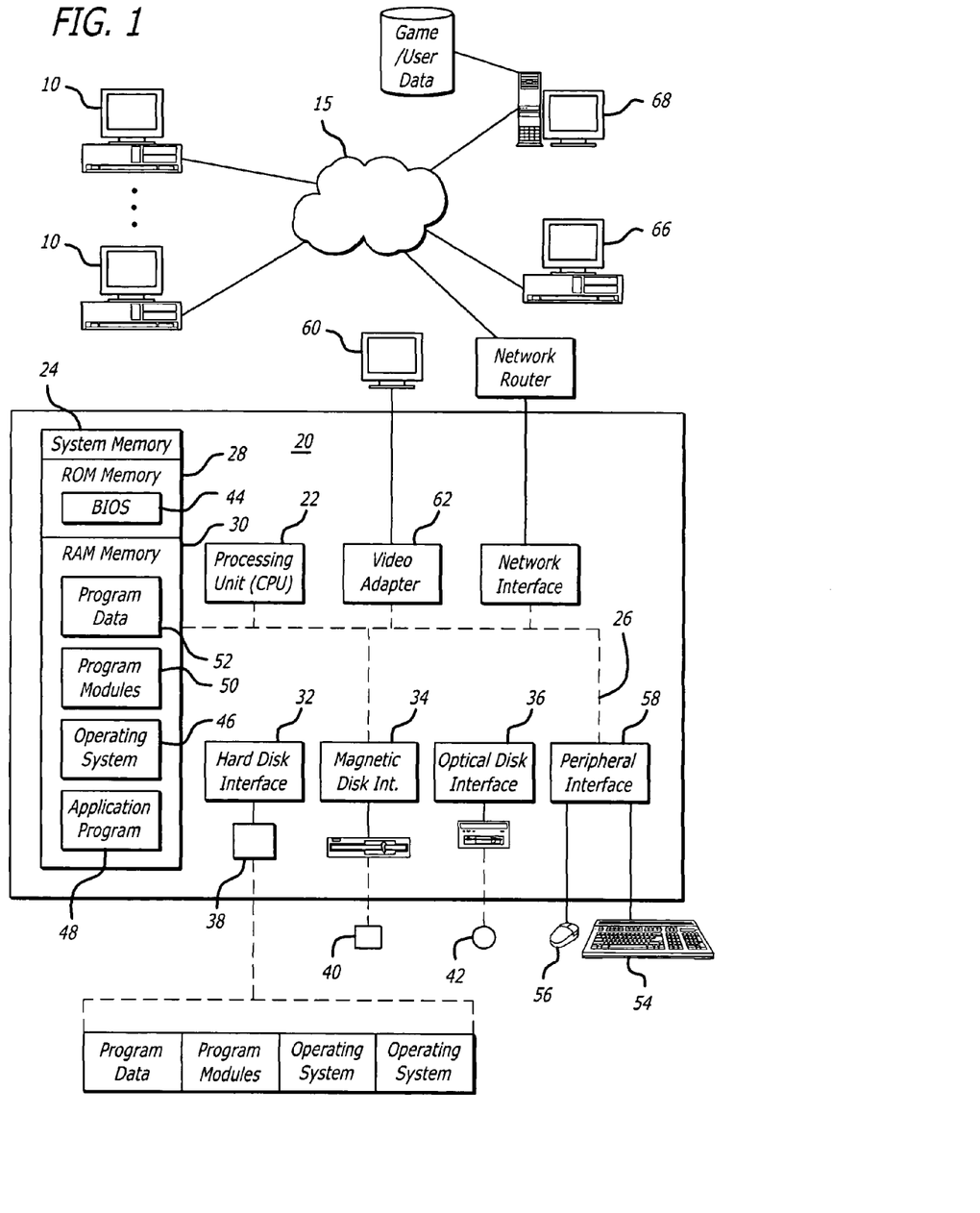
FIG. 1 is a block diagram illustrating components of an exemplary communication network environment.

More specifically, FIG. 1 illustrates a block diagram of an exemplary network game system wherein multiple client processing devices 10, which are utilized by the game participants or users, are in communication with a game server 20 via a network 15, such as the Internet. While a single game server 20 has been illustrated in FIG. 1, it will be appreciated that the tasks performed by the game server 20, which will be described in greater detail hereinafter, may be distributed among multiple game servers in a manner that is well known to those of ordinary skill in the art. Furthermore, since game play is to be accomplished by means of computer executable instructions being acted upon by the game server 20 as well as the processing devices 10, it will be understood that the game server 20 and processing devices 10 may be selected from devices such as personal computers, mainframe computers, personal-digital assistants ("PDAs"), cellular telephones, or the like.

For performing various tasks related to game play, the game server 20 preferably includes a processing unit 22 and a system memory 24 which may be linked via a bus 26. Without limitation, the bus 26 may be a memory bus, a peripheral bus, and/or a local bus using any of a variety of bus architectures. By way of further example, the bus 26 may include an architecture having a North Bridge and a South Bridge where the North Bridge acts as the connection point for the processing unit 22, memory 24, and the South Bridge. The North Bridge functions to route traffic from these interfaces, and arbitrates and controls access to the memory subsystem from the processing unit 22 and I/O devices. The South Bridge, in its simplest form, integrates various I/O controllers, provides interfaces to peripheral devices and buses, and transfers data to/from the North bridge through either a PCI bus connection in older designs, or a proprietary interconnect in newer chipsets.

As needed for any particular purpose, the system memory 24 may include read only memory (ROM) 28 and/or random access memory (RAM) 30. Additional memory devices may also be made accessible to the game server 20 by means of, for example, a hard disk drive interface 32, a magnetic disk drive interface 34, and/or an optical disk drive interface 36. As will be understood, these devices, which would be linked to the system bus 26, respectively allow for reading from and writing to a hard disk 38, reading from or writing to a removable magnetic disk 40, and for reading from or writing to a removable optical disk 42, such as a CD/DVD ROM or other optical media. The drive interfaces and their associated computer-readable media allow for the nonvolatile storage of computer executable instructions, e.g., program modules which may include routines, programs, objects, components, data structures, etc. that perform particular tasks or implement particular abstract data types.

When performing various of the acts and/or operations described hereinafter, which are at times referred to as being computer-executed, the processing devices will manipulate electrical signals representing data in a structured form. This manipulation transforms the data or maintains it at locations in the memory system, which reconfigures or otherwise alters the operation of the processing devices in a manner well understood by those of skill in the art of computer systems. Those skilled in the art will also appreciate that many types of computer readable media that can store data may be used for this purpose. Examples of such media devices include, but are not limited to, magnetic cassettes, flash memory cards, digital videodisks, Bernoulli cartridges, random access memories, nano-drives, memory sticks, and other read/write and/or read-only memories. For example, a basic input/output system (BIOS) 44, containing the basic routines that help to transfer information between elements within the game server 20, such as during start-up, may be stored in ROM 24. Similarly, the RAM 30 and/or the hard drive 38 may be used to store computer executable instructions comprising an operating system 46, one or more applications programs 48, other program modules 50, and/or program data 52.

For allowing a game technician/operator to enter commands and/or information into the game server 20, input devices such as a keyboard 54 and/or a pointing device 56 may be provided. While not illustrated, other input devices may include a microphone, a joystick, a game pad, a scanner, etc. These and other input devices would typically be connected to the processing unit 22 by means of an interface 58 which, in turn, would be coupled to the bus 26. Input devices may be connected to the processor 22 using interfaces such as, for example, a parallel port, game port, firewire, or a universal serial bus (USB). To view information from the game server 20, a monitor 60 or other type of display device may also be connected to the bus 26 via an interface, such as video adapter 62. In addition to the monitor 60, the game server 20 may also include other peripheral output devices, not shown, such as speakers and printers.

For operating in the illustrated communication network environment, the game server 20 generally utilizes logical connections to one or more remote devices such as, by way of example, the client processing devices 10, a technician computer 66, database server 68, etc. In this regard, while the remote processing devices have been illustrated in the exemplary form of computers, it will be appreciated that the remote processing devices may be any type of device having processing capabilities and/or the ability to establish a communication link with the game server 20. Again, the illustrated processing devices need not be implemented as a single device but may be implemented in a manner such that the tasks performed by the various processing devices are distributed to a plurality of processing devices linked through the communication network. Thus, the remote processing devices may include many or all of the elements described above relative to the game server 20 including memory storage devices, output devices (e.g., display, speaker, etc.), and input devices (e.g., keypad, joystick, mouse, microphone, etc.). The connection between the game server 20 and the remote processing devices is typically made through a further processing device 72 that is responsible for routing communications within the network.

By way of further example, the illustrated communication network may be implemented using a tiered architecture where one tier includes a front-end data base and Web applications running on Web server(s) that constitute an interface between users and the back-end of the system. In this manner, authorized users may access the system through a Web browser having a graphical user interface, for example, provided by a Java applet or as a common HTML page. To secure the system, the Web application may be surrounded by a firewall. The application logic would then constitute a further tier and may reside on a cluster of application servers including all of the capabilities necessary to support multiple simultaneous users.

For allowing a user to gain access to the game server 20, and game play, it is preferred that each user be requested to first register with the game server 20. Registration may be performed by the user supplying a user identifier (e.g., a log-in name). As will become apparent, user progress within the game may be stored in a database associated with the game server 20 (and thus be made retrievable) by being mapped to the user supplied identifier. Furthermore, communications intended for the user during game play may be made by directing such communications to a processing device 10 (identified by its address within the network) that has been associated with the user and user identifier. It is to be appreciated that the user supplied identifier need not correlate to the manner by which the player character of the user is identified to other users during game play as is described hereinafter.

Attempts to gain access to the game server 20 may also require that the user supply a password for authentication purposes. As is conventional, the password may be supplied by the user, and associated with the supplied user identifier, during the registration process. The registration process may also include the downloading to the processing device 10 of the user any computer executable instructions needed to facilitate game play. e.g., computer executable instructions for allowing data to be processed by the client devices 10 for displaying images on a display screen, whereby each player can recognize the progress of the network game from the images. Verified access to the game server 20 may also cause the downloading to the processing device of a user game patches, game updates, further downloads, etc. It will also be appreciated that any such computer executable instructions may be downloaded to the client devices 10 by means of distributed recorded media (e.g., CD or DVD ROM), etc.

Figure 2:
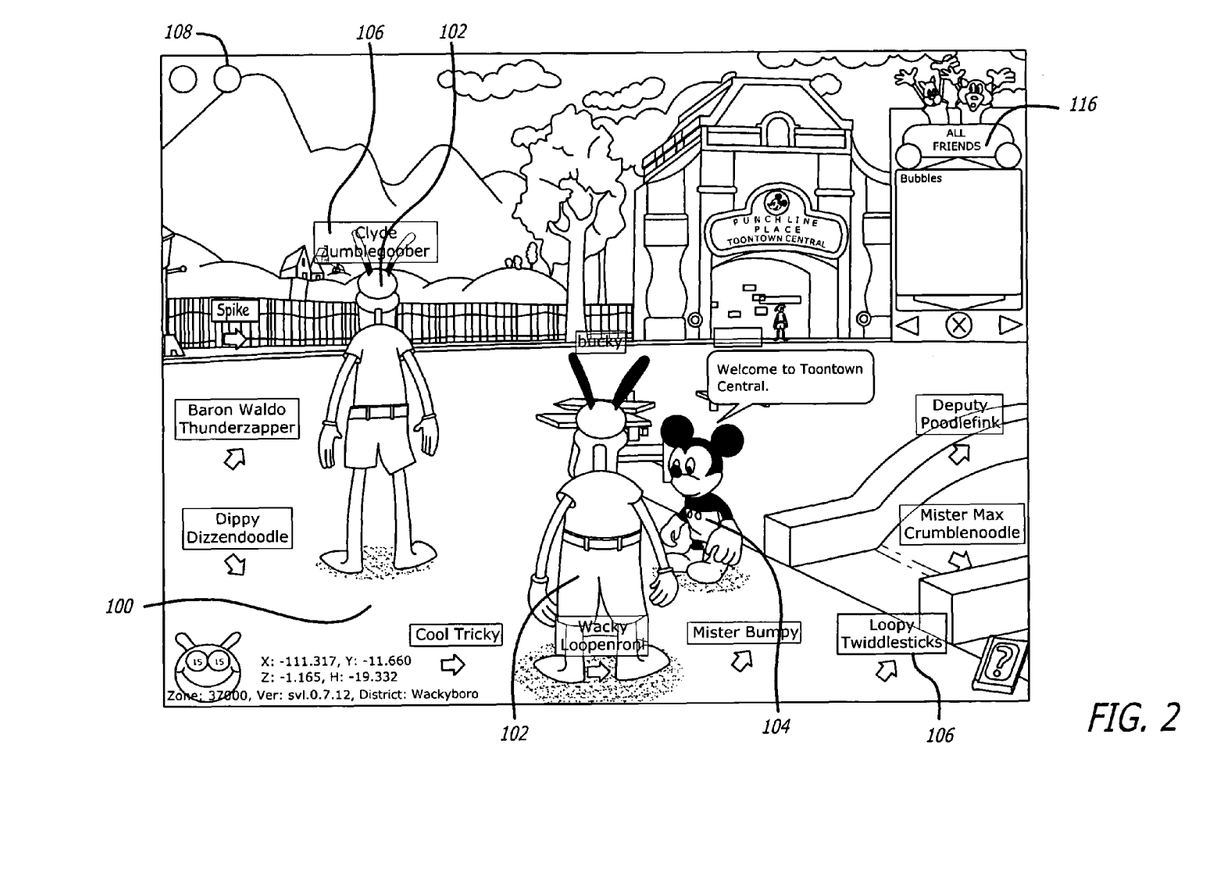
FIG. 2 is a screen shot illustrating an exemplary play field in a multi-user, interactive game playing, communication network environment.

Once game play commences, e.g., a user has created a player character and has placed the player character into the virtual game world maintained by the game server 20, the user will be able to interact with the virtual game world for the purpose of performing various tasks. As illustrated in FIG. 2, the virtual game world may include a game field 100, which serves as a space where characters (including player characters and non-player characters) can move, that is displayed on a display associated with a client processing device 10. In this regard, the game field 100 is composed of geographic data complying with scenes of the game. Furthermore, on the field 100 there may exist multiple player characters 102, which are responsive to actions of users of corresponding client processing devices 10, as well as non-player characters 104, which are presented under the control of the game server 20. As noted, the manner by which the player character of the user is identified to others during game play need not reflect the identifier a user has provided to gain access to the communication network.

Figure 3:
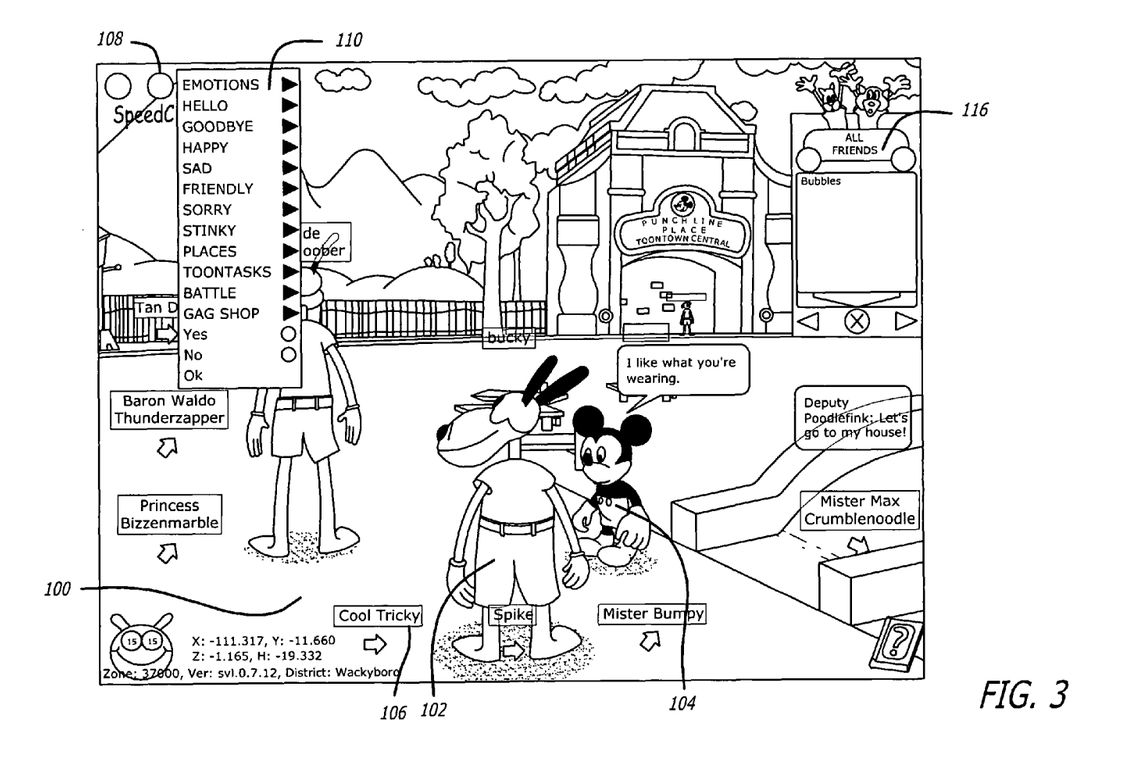
FIGS. 3 and 4 are screen shots illustrating an exemplary menu system for facilitating secure communications between users in a multi-user, interactive game playing, communication network environment.

As a user moves his player within the virtual world, the user may perform various tasks in accordance with the objectives of the game. In addition, the network game may also provide for the user to communicate with other users via chat messages. Communications may be facilitated by displaying not only the player characters 102 of users, but also a "name" 106 that has been associated with the player characters 102. In the case where player characters of other users are not presently in a view being displayed to a user, the system may nevertheless cause the "name" 106 of such other player characters to be displayed in connection with an indicator that serves to direct the user towards a view that will include such currently un-viewable player characters as is illustrated in FIG. 3. To minimize display clutter, the display of names of un-viewable player characters may be limited using a predefined criteria, for example, by displaying only the names of un-viewable player characters that are within the same scene as the player character of the user. Thus, it is seen that the player character names allow a user to identify player characters to, for example, monitor actions of player characters, direct chat messages to one or more player characters, etc.

Figure 4:
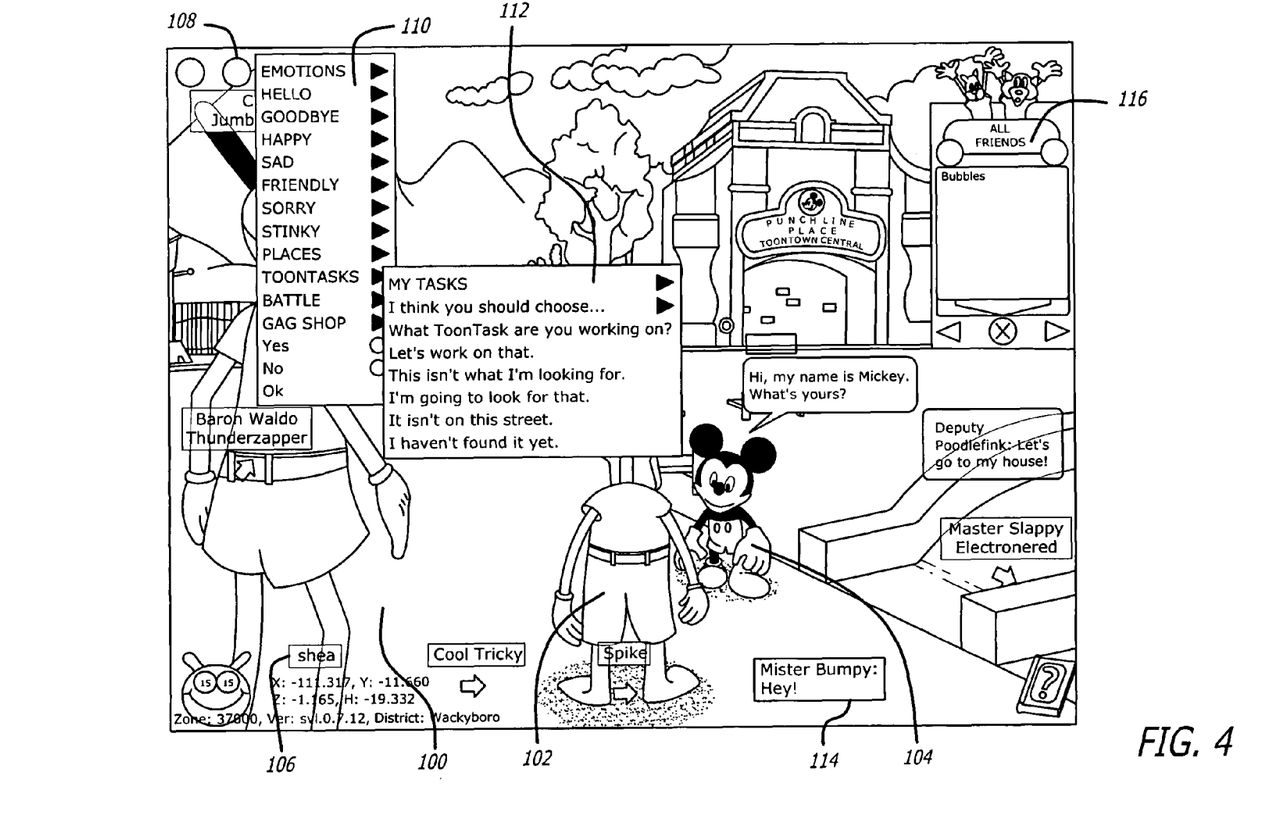

For allowing a user to initiate chat message communications with other users, the display may further include a selectable "Speed Chat" icon 108 the selection of which will allow a user to access a menu 110 of selectable, pre-prepared chat messages (i.e., words/phrases such as illustrated in FIGS. 3 and 4). In this regard, it is to be appreciated that the provision of a menu of selectable, pre-prepared chat messages may be desirable since physically typing a text message can be a fairly difficult, slow, and tedious process for users such as children, handicapped, people that cannot type, players on a game console not having a keyboard, etc. Moreover, the provision of a menu of selectable, pre-prepared chat messages may be desirable as an aid for guiding interaction between users (or users and the environment). As an example, in a gaming environment, the textual conversation between users and the game AI, represented by non-player characters 104, can go from being coherent to fairly nonsensical, in particular in cases where a user is free to type arbitrary text messages in the text interface and, thereby, interact incorrectly with the game AI. Still further, an advantage of the menu based system is that, since it limits interaction to pre-determined words and phrases, it complies with the Children's Online Privacy Protection Act of 1998 (COPPA), which requires online content providers to protect the privacy of children playing online games with strangers. Without this menu based feature, a child's personal information such as his or her address/phone number could be easily communicated by a child to a stranger.

More specifically, the example menus illustrated in FIGS. 3 and 4 provide a mode of intelligent communication between users, as well as between users and the environment, by providing selectable words/phrases that are arranged using a hierarchy. At a first level 110 of the hierarchy, the user may be presented with words/phrases and/or categories in which further words/phrases are logically organized (e.g., "EMOTIONS," "HELLO," "GOODBYE," "HAPPY," "SAD," etc.). Selection of a word/phrase would complete the present communication process (i.e., indicate that the final phrase has been completed) while selection of a category may cause the menu to be expanded to a second level 112 which presents to the user further words/phrases and/or sub-categories that correspond to the selected category. This hierarchical mechanism of providing selectable words/phrases/sub-categories preferably continues until the user selects, at some level, a word/phrase as opposed to a sub-category (since the selection of a sub-category indicates a desire that the user desires to further drilldown within the menu hierarchy). Menu navigation may be performed, for example, by the user moving a cursor over various parts of the menu to cause the menu to expand and/or contract until the desired word/phrase is uncovered at which time the user may select the desired word/phrase by clicking a mouse button. In the example, categories and sub-categories may be indicated to the user by providing an arrow that symbolizes that further words/phrases are available for selection (which categories and sub-categories may expand in response to the cursor being positioned thereupon). Still further, the "titles" of previously selected categories/subcategories may be reflected in the final phrase formed by the user. As will be described hereinafter, a representation of the finally selected word/phrase may then be submitted to the game server 20 as part of a process to display the chat message (e.g., present the chat message in a communication pop-up 114) to one or more other users within the game network environment. It will also be appreciated that words/phrases from the menu system may be assigned to and selected through the use of hot keys of a keyboard, mouse, displayed icons, etc. The assignment of words/phrases to hot keys may be made by the user—for example by the user selecting the hot key and then selecting the words/phrase to be assigned to the hot key in a setup process—or may be predetermined by the game—which assignment may be static or dynamic based upon game conditions.

Figure 5:
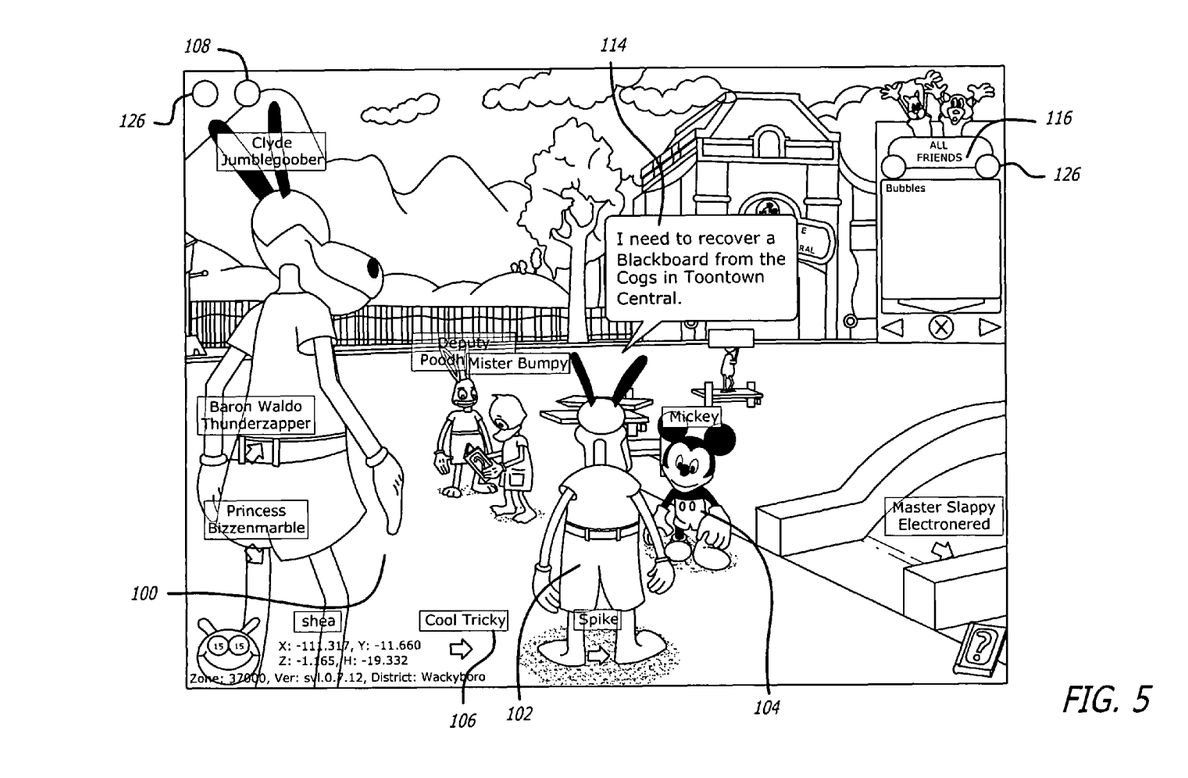
FIG. 5 is a screen shot illustrating an exemplary result achieved by interacting with the chat menu illustrated in FIGS. 3 and 4.

By of way of more specific example, in the game environment, the player may be presented with a first menu 110 having the following selectable words/phrases and categories: "HELLO," "GOODBYE," "HAPPY," "SAD," "FRIENDLY," "BATTLE," "TOONTASKS." Upon selecting "BATTLE," for example, the player enables a second menu having the following selectable words/phrases and sub-categories: "LETS USE" "HURRY UP," "NICE SHOT," "MISSED ME," "RUN," "WE ARE IN TROUBLE." In this case, the words/phrases and sub-categories in the second menu level are logically related to the previously selected category "BATTLE," i.e., the second menu level contains words/phrases and sub-categories of further words/phases that a user would typically wish to communicate during a battle scene. The user could then proceed to select "HURRY UP" to indicate a desire to communicate a final phrase of "LET'S HURRY UP THE BATTLE." Similarly, the user may select the category "TOONTASKS" to open a second menu having the sub-category "MY TASKS" which may be selected to open a third menu having dynamically changing content reflective of currently assigned game tasks, e.g., a selection having the phrase "I NEED TO RECOVER A BLACKBOARD FROM THE COGS IN TOONTOWN CENTRAL," as illustrated in FIGS. 3-5.

It is to be further appreciated that communications selected from the menu need not be limited to textual or to be verbalized (e.g., from a speaker) communications. For example, the menu system may provide a means for a user to select a word/phrase for the purpose of causing their character to perform an animated sequence reflective of the selected word/phrase. By way of example, selection of the word "WAVE" may result in the player character of the user performing an animated wave. Similarly, the selection of a word/phrase may also cause the player character of the user to be displayed as saying the word/phrase while simultaneously performing an animated action corresponding to the selected word/phrase.

As noted, the menu system may be dynamically updated/changed to reflect game objectives and tasks. In addition, the choices of words in the menu can also change when the gamer interacts with different non-player characters and/or when the environment of the virtual game world changes (e.g., when day turns to night in the game). Still further, the words/phrases may be dynamically updated/changed to allow a user to express communications reflective of real word conditions, e.g., to wish other players "happy holidays" during the month of December. Thus, this menu based dynamic sentence building option can provide for a simple, yet rich and an immersive gaming experience.

It will be additionally appreciated that a means may be provided for the user to customize their hierarchal menu by, for example, selecting from a prepared library those words/phrases that they wish to have included in their menu. The user may also be provided with an opportunity to select colors, fonts, etc. for any text messages that will be displayed that originate from that user.

The above described menu-driven, hierarchical, and context sensitive system that permits construction of messages from words/phrases can additionally be used in a stand-alone manner outside of the described communications environment. As an example, this system can be used as an educational tool for enabling children/adults to develop their linguistic abilities. To this end, in one embodiment, the first menu could have words/phrases such as "HELLO, . . . ," "BRING ME . . . ," "LET'S HAVE . . . ", etc., while the second menu that is enabled by selecting "HELLO, . . . ," could include words phrases such as "HOW ARE YOU?," "A CAKE," and "FUN." Accordingly, if the child selects "A CAKE" from the second menu, a tutor program could indicate that the formed string "HELLO A CAKE" is grammatically incorrect. In contrast, if the child selects "HOW ARE YOU?" from the second menu, then the tutor program could indicate that the formed string "HELLO, HOW ARE YOU?" is grammatically correct. The tutor program could be available as a component of the software program that implements the subject system.

It will also be appreciated that such a menu driven chat communication system may be useful in applications where the user does not have access to a keyboard or in situations where typing is difficult, e.g., the user simply cannot type quickly, the keys of the keyboard are too small, etc. Thus, the menu driven chat communication system may be used advantageously in connection with cell phone applications, blackberry applications, game console applications, etc.

Figure 6:
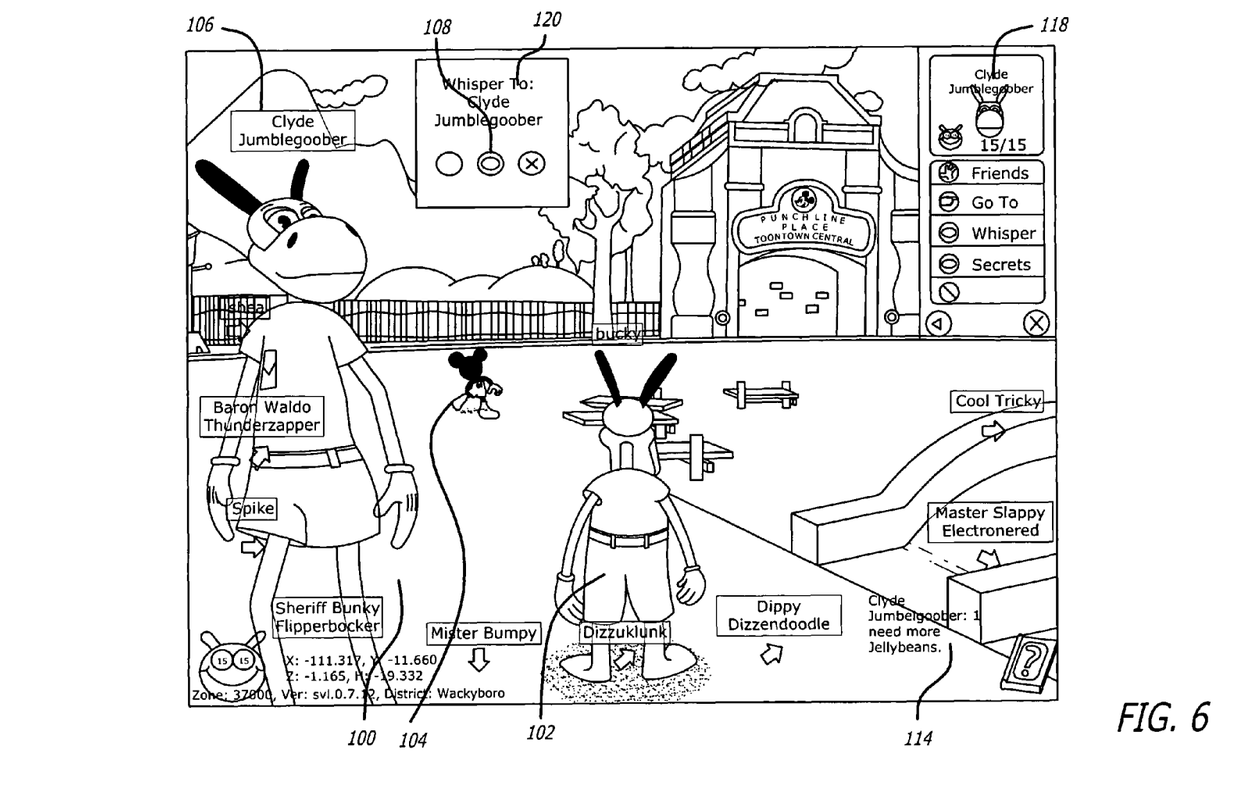
FIG. 6 is a screen shot illustrating an exemplary system for initiating private communications with other users in a multi-user, interactive game playing, communication network environment.

As noted previously, chat messages that are to be communicated by means of the menu system may be displayed only to other designated users or globally, e.g., to those users having a player character within the same scene as the player character of the user initiating the communication. In cases where the user does not designate that a communication is intended only for other specified users, the communication will be broadcast globally. Intended recipients of a communication may be designated, for example, by a user interacting with player character names displayed in an "all friends" menu 116. In this regard, it may be preferred that a user be required to inquire of another user if they can be added to the "All Friends" menu prior to allowing directed communications to that user. By way of example illustrated in FIG. 6, the user may select "Clyde Jumblegoober" from the all friends menu 116 to cause a menu of actions 118 related to "Clyde Jumblegoober" to be displayed. The user may then select the menu choice "Whisper" to direct a communication only to the user of "Clyde Jumblegoober." In particular, selecting "Whisper" may result in the display of a further "Whisper" menu 120 that includes a "Speed Chat" icon 110 the selection of which will display a hierarchal menu to allow a user to create a chat message to be communicated only to the user of "Clyde Jumblegoober." While such "private" communications may be displayed to an intended recipient user irrespective of the location of that user's player character within the virtual world relative to the location of the player character of the communication sender, the displaying of global messages, as noted previously, may be limited according to one or more predefined criteria, e.g., a criteria based upon the location of the player character of the communication sender. Furthermore, communications displayed in communication bubbles 114 may be displayed to show a relationship between the communication and the player character of the user initiating the communication (e.g., over the head of the player character 102 as illustrated in FIG. 5). In the case where the player character of the user initiating the communication is out of view of communication recipients, the name of the player character may be simply included as part of the communication bubble 114 as illustrated in FIG. 4 (e.g., the communication from "Deputy PoodleFink").

To facilitate menu-driven chat (i.e., creation and display), it is preferred that the client processing devices 10 of the various users be supplied (by downloading, updating, etc.) with a dictionary of the textual words/phrases utilized in connection with game play within the communication network. Preferably, the textual words/phrases that are provided to a client processing device 10 are in a language that is appropriate for the user of the client processing device. For example, for users that speak Spanish, the textual words/phrases on their client device 10 should be in Spanish while for users that speak English, the textual words/phrases on their client devices 10 should be in English. Generally, the language preference of a user may be determined by performing a scan of the client processing device 10 during a downloading or updating process, e.g., the information may be retrieved from a registry file or the like. Provision may also be made for the user to manually specify a language preference. Thus, when the hierarchal menu is presented to a user, stored textual words/phrases in a language appropriate for that user are utilized.

Figure 9:
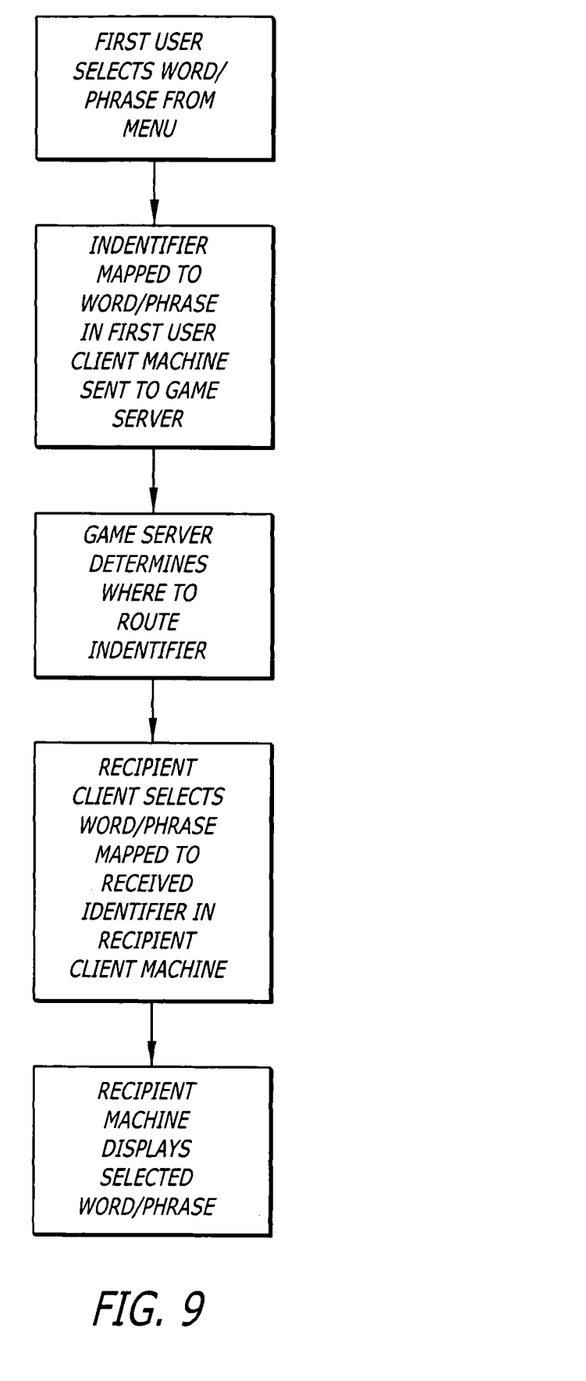
FIG. 9 is a flow chart diagram illustrating steps performed by a message exchange system employing the menu system illustrated in FIGS. 4 and 5.

Similarly, the stored textual words/phrases are accessed when displaying a menu-driven chat communication to a user. To this end, stored textual words/phrases are mapped to identifiers. Thus, as illustrated in FIG. 9, when a user submits a menu-driven chat communication to the game server 20, rather than transmit the actual text that comprises the message, one or more identifier(s) representative of the message are transmitted to the game server 20 (e.g., "message 1"). The game server 20 then routes the identifier(s) to the client processing devices 10 of the appropriate users. For example, the transmission of the identifier may indicate that the message is to be presented globally and, in response, the game server may determine who the global recipients should be and route the identifier(s) thereto (e.g., those users that have a player character in an area occupied by the player character of the message originator). The transmission of the identifier may also indicate that the message is to be presented "privately" to designated users (e.g., by including a representation of a player character identifier, e.g., a sequence of symbols that uniquely identifies the player character of a user within the system, of the player character name of intended recipients in the message whereby the play character identifier may be cross-referenced to a user and the address of a client machine determined—In this regard, it will be appreciated that multiple player characters may have the same player character name while the player character identifier of each user should be unique). Upon receiving identifier(s) from the game server 20, a recipient client processing device 10 may access its stored textual words/phrases to retrieve the textual word/phrase that has been mapped within the recipient client processing device 10 to the received identifier(s). The recipient client processing device 10 may then display the retrieved textual word/phrase in an appropriate communication bubble 114. As noted previously, the recipient client processing device 10 may also be informed as to any colors (foreground, background, text, etc.) and fonts to utilize when displaying the word/phrase.

From the foregoing, it will be appreciated that the interactive multi-user communication environment provides a simple mechanism by which users that speak different languages may communicate. As an example, assuming user X located in Germany, having access to German words/phrases in the chat system, prefers to initiate communication with user Y in Japan who has access to Japanese words/phrases in his chat system. User X would then form a string based on the selected German words/phrases from his interface for communicating with user Y. The identifiers representative of the words/phrases would be provided to the interface of user Y, via transmission through the game server 20, whereupon the Japanese words/phrases corresponding to the received identifiers would be presented to the Japanese speaking user. It will also be appreciated that such a system of communicating essentially eliminates the possibility of a user being displayed a messages that may be inappropriate (i.e., the text messages to be displayed are restricted by the library stored on the receiving processing device without regard to the content of text messages that were used to generate the communication transmission).

It will also be understood that the menu-driven system allows users to interact, in real-time, by exchanging information. This ability to communicate permits multiple users to co-ordinate their activities in the multi-user interactive environment by means of secured and coherent communications. As an example, in an online multiplayer game environment, if player X is performing action A and another player Y is performing action B then the two players can exchange information about their assigned actions through the menu driven system so as to co-ordinate their activities. Specifically, if player X is going to fetch a powerful titanium sword from a shop in the game, and player Y is heading to eliminate an evil character in the game without the powerful titanium sword, then player X would select "I AM . . . " from the first menu and "GETTING TITANIUM SWORD" from the correspondingly enabled second menu to inform player Y of the intended action. Accordingly, player Y would use the menu driven system to inform player X that he was out to eliminate an evil character but didn't have the sword. Thus, the two players could co-ordinate their activities to achieve the same or similar goals in the game.

Figure 7:
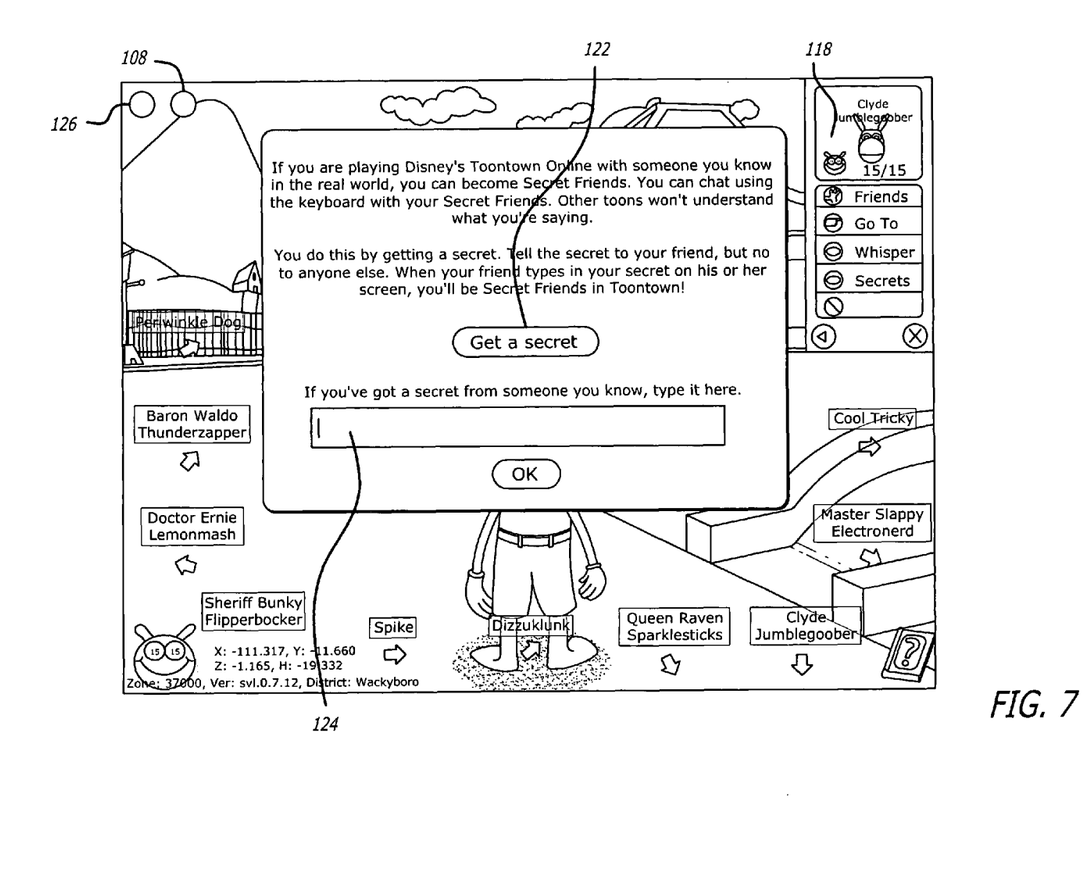
FIGS. 7 and 8 are screen shots illustrating an exemplary code exchange system for allowing a user to be designated as a recipient of textual communications in a multi-user, interactive game playing, communication network environment.
Figure 8:
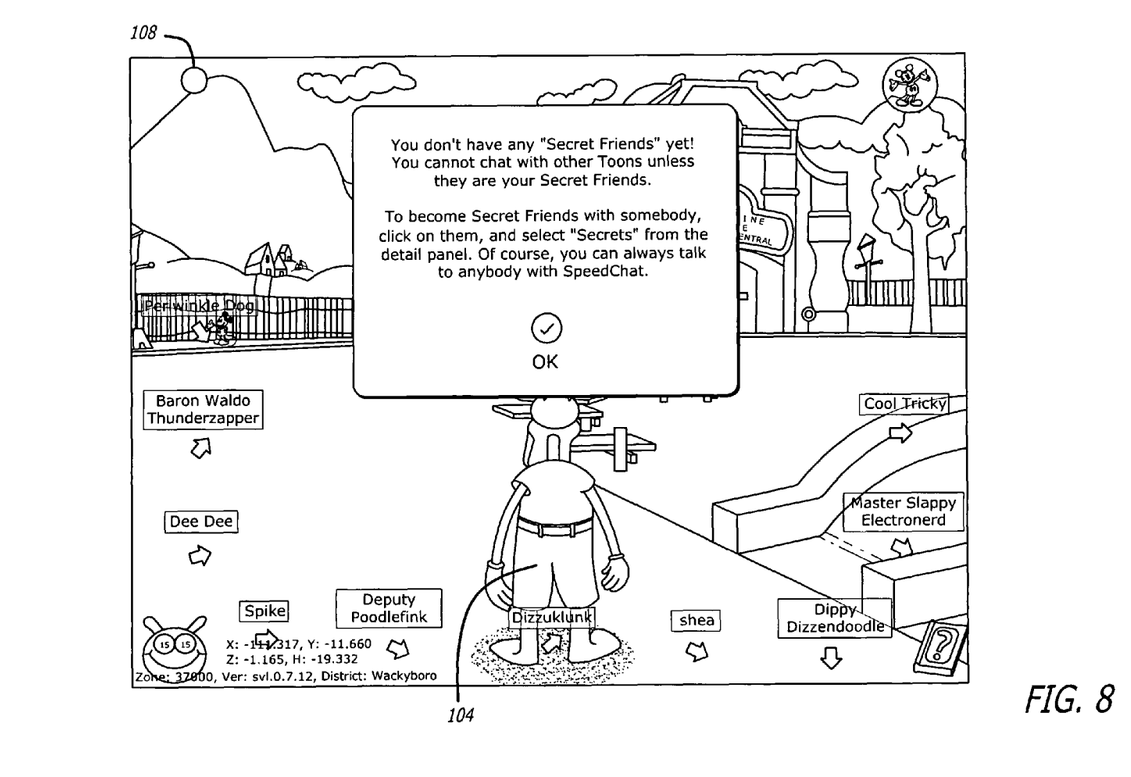
Figure 10:
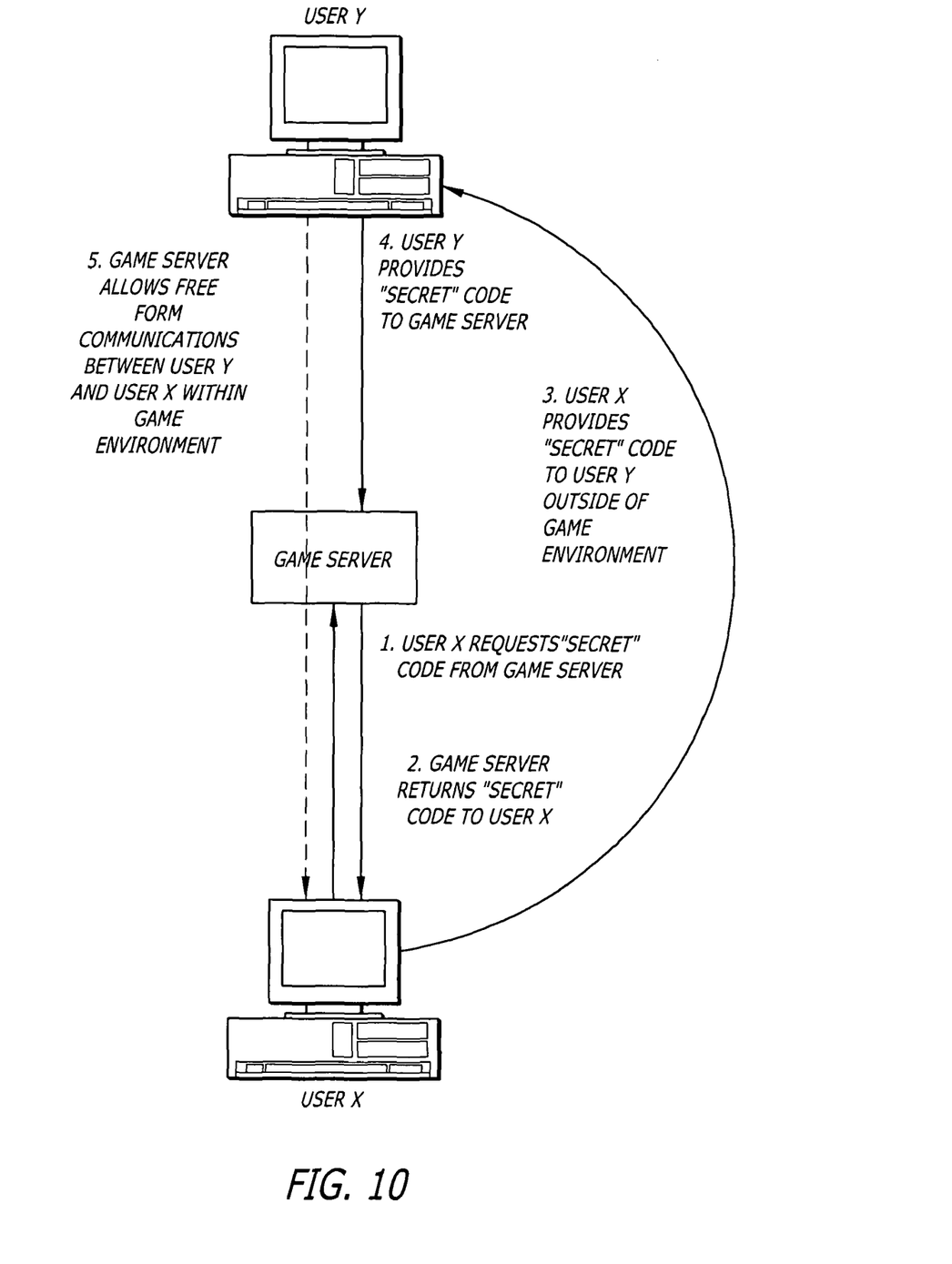
FIG. 10 is a block diagram illustrating the flow of data to allow free form communications within the multi-user, interactive game playing, communication network environment.

The multi-user interactive communication environment may additionally provide a mechanism for exchanging typed (i.e., free form) messages. For example, as illustrated in FIG. 10, if user X prefers to initiate a free form interaction with another user Y, then user X may be required to first get a unique identification code from the game server 20. The unique identification code, i.e., a "secret," may be retrieved by selecting an appropriate icon, such as the "Get A Secret" icon 122 illustrated in FIG. 7. In response to this request, a randomly generated sequence of symbols (e.g., alpha-numeric symbols and/or graphical symbols) may be provided to the requesting user, e.g., user X. User X, upon receiving this unique "secret code," can subsequently send it to user Y via a mode outside of the communication environment (e.g., through electronic mail, fax, postal system, direct face to face contact, handwritten notes, facsimile, etc.). User Y could then initiate real-time, free form interaction directly with user X, if user X is present in the environment, by inputting this "secret code" in the environment and then getting it authenticated by the environment. Authentication may be performed, for example, by entering the symbol string into a "Secret Entry" field 124 as illustrated in FIG. 7. The "Secret Entry" field 124 may be presented to a user in response to the user selecting "Secrets" from a detail panel/menu 118 for a user's player character. FIG. 8 illustrates a screen provided to a user having no "secret friends" with instructions for becoming a "secret friend" with another user.

While not required, it is preferred that the unique "secret code" has a limited time period, such as two days, before it expires. In such a case, if user Y uses the unique "secret code" within that limited time period, the authenticated relationship between user X and user Y may continue even after the limited time period expires. An authenticated relationship between two users may thus last for a further pre-determined period of time or indefinitely, requiring one of the users to notify the game server 20 that the relationship is to be severed. If, however, the unique "secret code" provided to a user expires, it is preferred that a new unique "secret code" be generated for that user in response to a request to get a "secret code," e.g., a new randomly generated "secret code" is provided rather than reissuing the "secret code" previously provided to the user.

Once a "secret" chat relationship has been registered with the game server 20, fields for typing in free form messages to "secret" friends may be displayed to a user upon selection of a secret chat icon 126. In this regard, the exchange and registration of a "secret code" may allow the user to communicate bi-directionally through free-form messages. It will also be appreciated that two sets of unique "secret codes" for two different users may need to be authenticated or validated by the game server 20 prior to allowing secret, textual communications between the two users to be bi-directionally exchanged. It will be further appreciated that the unique "secret code(s)" obtained from the game server 20 could allow only two users to selectively interact, or multiple users. In either case, the game server 20 would still verify the validity of the "secret codes" before "correlating" the users as a function of the entered unique "secret codes" which correlation allows users to subsequently establish contact with one another.

When free form communications occur between users, the free form communications may be "Whispers," as described previously, or exchanged in a broadcast manner. When exchanged in a broadcast manner, users that are not part of the relationship defined by the exchange of a unique "secret code" will not be able to view the free form messages. Rather, such users may be displayed generic text, such as "meow, meow" or "bark, bark," that is associated with the player character of the user transmitting a free form communication. In addition, since the system may provide for the audibilizing of exchanged communications, users outside of the relationship may only hear a corresponding generic sound.

It will also be appreciated that the two-communication modes above described may be used in cooperation. In this manner, the communication environment may an electronic locking/unlocking arrangement that allows conversations between users to be conducted in either a controlled or in a free form manner. For example, assuming a children's online gaming environment, a parental lock/unlock mechanism will enable children to either converse/chat among themselves in a controlled or secure manner (e.g., through the described menu driven system) or in an "open" free form manner through a textual interface (which allows typing arbitrary text messages). In the open chat option, the environment may optionally provide a message filter that automatically deletes specific words or phrases (e.g., bad language, phone numbers, addresses, etc.) that are typed by the players.

It will also be seen that the described multi-user communication environment allows a keyboard and/or a mouse to provide enhanced secured and private communication between users. As an example, this security is provided when user X performs the following steps in the communication environment, (i) user X accesses a particular window/menu in the environment either through a mouse or a keyboard (e.g., a hot-key), and (ii) user X inputs the unique identifying code, of user Y, via the keyboard, in the accessed window in order to initiate communication with a known user Y. Alternatively, the multi-user communication environment uses a keyboard (and/or a mouse) and the menu driven system to provide enhanced privacy protection for users. This protection is achieved as no personal information is inputted by user X when communicating with user Y using this system.

It is also to be noted that the subject system may be adapted to provide an interactive environment that can be accessed, at least to a partial degree, even before the full program has been downloaded, for example, from an Internet site. This is particularly useful when a user needs to access the system to test it before download is complete, especially considering the large sizes of complex programs. As an example, a user could (i) view an introduction to the game as soon as it is downloaded while the rest of the program is being downloaded, (ii) play the tutorial as soon as the tutorial has been downloaded (in part or full) while the rest of the program is being downloaded, and (iii) start playing the game before download of the full game is complete. To this end, predefined modules of the game are downloaded during each download session and access to features contained within each module is restricted until downloading of that module is complete. However, while a module is being downloaded as a background task, previously downloaded game modules may be executed to at least interact with a part of the overall game environment.

While various concepts have been described in detail, it will be appreciated by those skilled in the art that various modifications and alternatives to those concepts could be developed in light of the overall teachings of the disclosure. For example, while described in the context of tasks performed by software, this description is not meant to be limiting. Rather, those skilled in the art will further appreciate that various acts and operations described herein may also be implemented in hardware. Furthermore, it will be appreciated that game play may be enhanced by allowing users to customize the graphical user interface elements (e.g., locations, colors, etc.) used to access one or more the aforementioned game play features. As such, the particular concepts disclosed are meant to be illustrative only and not limiting as to the scope of the invention which is to be given the full breadth of the appended claims and any equivalents thereof.

We claim:

1. A method comprising:
limiting communication between users in a multi-user communication environment to a menu-driven system until an authenticated relationship is established between the users, wherein the menu-driven system is limited to exchange of chat messages selected from a pre-prepared library of chat messages;
receiving a request for a unique code by a first user at the multi-user communication environment;
generating the unique code by the multi-user communication environment;
providing the unique code generated by the multi-user communication environment to the first user in the multi-user communication environment;
responsive to transmission of the unique code from the first user to a second user via a communication path outside of multi-user communication environment:
receiving the unique code from the second user at the multi-user communication environment;
establishing the authenticated relationship between the first user and the second user in response to receipt by the multi-user communication environment of the unique code from the second user; and
enabling free form communication between the first user and the second user in response to establishing the authenticated relationship between the first user and the second user, wherein the free form communication is not restricted to the pre-prepared library of chat messages, and the free form communication acts as private chat between users having an authenticated relationship only.

2. The method according to claim 1, wherein the unique code is provided to the first user by the multi-user communication environment.

3. The method according to claim 2, wherein the multi-user communication environment is an online multiplayer gaming environment.

4. The method according to claim 1, wherein the unique code is transmitted by the first user to the second user through at least one of an email program, a telephone conversation, a handwritten note, a chat room program, direct communication, a instant message program, and a facsimile.

5. The method according to claim 3, wherein the first user initiates real-time and secure communication with the second user after the unique code is authenticated in the multi-user environment; and further wherein the pre-prepared chat messages correspond to one or more gaming functions.

6. The method according to claim 1, wherein the code comprises a sequence of symbols.

7. The method according to claim 1, wherein the code comprises a sequence of alpha-numeric symbols.

8. A non-transitory computer readable media having instructions for facilitating communication in real-time between users in a multi-user communication environment, the instructions performing steps comprising:
    limiting communication between users in a multi-user communication environment to a menu-driven system until an authenticated relationship is established between the users, wherein the menu-driven system is limited to exchange of chat messages selected from a pre-prepared library of chat messages;
    receiving a request for a unique code by a first user at the multi-user communication environment;
    generating the unique code by the multi-user communication environment;
    providing the unique code generated by the multi-user communication environment to the first user in the multi-user communication environment;
    responsive to transmission of the unique code from the first user to a second user via a communication path outside of multi-user communication environment:
    receiving the unique code from the second user at the multi-user communication environment;
    establishing the authenticated relationship between the first user and the second user in response to receipt by the multi-user communication environment of the unique code from the second user; and
    enabling free form communication between the first user and the second user in response to establishing the authenticated relationship between the first user and the second user, wherein the free form communication is not restricted to the menu-driven system of the pre-prepared library of chat messages, and the free form communication acts as private chat between users having an authenticated relationship only.

9. The computer readable media according to claim 8, wherein the unique code is a random sequence of symbols generated by the multi-user communication environment.

10. The readable media according to claim 8, wherein the multi-user environment is an online multiplayer gaming environment.

11. The readable media according to claim 10, wherein the unique code is provided to the first user in response to a request by the first user; and further wherein the pre-prepared chat messages correspond to one or more gaming functions.

12. The computer readable media according to claim 8, wherein the unique code is valid for a limited period of time.

13. A method for initiating free form communication between a plurality of users in a multi-user gaming environment via an exchange of words selected from a menu of predetermined words determined by the gaming environment, the method comprising:
    establishing predetermined word communication via an exchange of words selected from the menu between a first user and at least one second user in the multi-user gaming environment, wherein the menu comprises a pre-prepared library of words;
    receiving a request for a unique code by the first user at the multi-user gaming environment;
    generating the unique code by the multi-user gaming environment;
    providing the unique code generated by the multi-user gaming environment to the first user in the multi-user gaming environment during the exchange of words selected from the menu of predetermined words between the first user and the at least one second user;
    responsive to transmission of the unique code to the at least one second user via a communication path outside of the multi-user gaming environment:
    receiving the unique code from the at least one second user at the multi-user gaming environment;
    establishing an authenticated relationship between the first user and the at least one second user in response to receipt by the multi-user gaming environment of the unique code from the at least one second user; and
    the environment permitting the first and at least second users to thereafter communicate via free form secure communication when the unique code has been authenticated by the multi-user gaming environment, wherein the free form secure communication is not restricted to the menu comprising a pre-prepared library of words and the free form communication acts as private chat between users having authenticated relationship only.

14. The method of claim 13 wherein the menu of predetermined words includes a predetermined set of word commands.

15. The method according to claim 13, wherein the unique code is provided in response to a request by one of the users.

16. The method according to claim 13, wherein the unique code is valid only for a limited time.

17. An apparatus comprising:
    one or more processors; and
    a computer readable storage medium, in operable connection with the one or more processors, having a program of instructions executable by the one or more processors, the program of instructions comprising:
    code configured to limit communication between users in a multi-user online game to a menu-driven system of pre-prepared chat messages until an authenticated relationship is established between the users, the menu-driven system of pre-prepared chat messages comprising a set of pre-prepared chat messages associated with one or more game actions of the multi-user online game
    code configured to receive a request of a unique code by a first user at the multi-user online game;
    code configured to generate the unique code by the multi-user online game;
    code configured to provide the unique code generated by the multi-user online game to the first user in the multi-user online game;
    code configured to receive the unique code from a second user at the multi-user online game;
    code configured to enable establishment of the authenticated relationship between users; and
    code configured to enable free form communication between the first user and the second user in response to establishing the authenticated relationship between the first user and the second user, wherein the authenticated relationship is established via exchange of the unique code between the users;

wherein the menu-driven system of pre-prepared chat messages prevents transmission of the secret code between the first user and the second user via the multi-user online game.

18. The apparatus according to claim 17, wherein the code configured to enable establishment of the authenticated relationship between users further comprises:

code providing a first user the secret code in response to a request of the first user for the secret code; and code for receiving and authenticating the secret code from the second user.

19. The apparatus according to claim 17, wherein the pre-prepared chat messages are restricted to a stored library configured to essentially eliminate certain communications between the users.

20. The apparatus according to claim 17, wherein the menu-driven system of pre-prepared chat messages further comprises:

a first menu of pre-prepared chat messages provided to a first user in a first language, the first menu of pre-prepared chat messages being associated with identifiers;

a second menu of pre-prepared chat messages provided to a second user in a second language, the second menu of pre-prepared chat messages being associated with the identifiers;

wherein the program of instructions further comprises:

code configured to permit communication between the first user and the second user via association of one or more pre-prepared chat messages in the first language with one or more pre-prepared chat messages in the second language via the identifiers.

21. The apparatus according to claim 17, wherein the menu-driven system of pre-prepared chat messages is dynamically updated to reflect game tasks.

\* \* \* \* \*